(12) United States Patent
Morper

(10) Patent No.: US 8,976,704 B2
(45) Date of Patent: Mar. 10, 2015

(54) METHOD, SYSTEM AND NODES FOR NETWORK TOPOLOGY DETECTION IN COMMUNICATION NETWORKS

(75) Inventor: Hans-Jochen Morper, Erdweg (DE)

(73) Assignee: Nokia Siemens Networks Oy, Espoo (FI)

( * ) Notice: Subject to any disclaimer, the term of this patent is extended or adjusted under 35 U.S.C. 154(b) by 329 days.

(21) Appl. No.: 12/702,394

(22) Filed: Feb. 9, 2010

(65) Prior Publication Data

US 2010/0208621 A1 Aug. 19, 2010

(30) Foreign Application Priority Data

Feb. 13, 2009 (EP) ..................... 09100113

(51) Int. Cl.
| | |
|---|---|
| H04L 12/28 | (2006.01) |
| G06F 15/173 | (2006.01) |
| H04W 40/24 | (2009.01) |
| H04W 8/00 | (2009.01) |
| H04L 12/24 | (2006.01) |
| H04W 84/18 | (2009.01) |

(52) U.S. Cl.
CPC ............. *H04W 40/246* (2013.01); *H04L 41/06* (2013.01); *H04L 41/0853* (2013.01); *H04L 41/0866* (2013.01); *H04L 41/12* (2013.01); *H04W 8/005* (2013.01); *H04W 84/18* (2013.01)
USPC ........... 370/254; 370/255; 370/400; 709/221; 709/224

(58) Field of Classification Search
USPC ......... 370/255, 252, 253, 254, 256, 351, 389, 370/392, 400, 401; 709/224, 220, 221, 222, 709/223, 228, 208, 209
See application file for complete search history.

(56) References Cited

U.S. PATENT DOCUMENTS

| | | | | |
|---|---|---|---|---|
| 5,732,086 | A | 3/1998 | Liang et al. | 370/410 |
| 5,812,532 | A * | 9/1998 | Oki et al. | 370/255 |
| 6,631,128 | B1 * | 10/2003 | Lemieux | 370/351 |
| 7,911,978 | B1 * | 3/2011 | Chandra et al. | 370/255 |
| 7,916,666 | B2 * | 3/2011 | Yoon et al. | 370/255 |
| 2003/0214914 | A1 * | 11/2003 | Cain | 370/252 |
| 2007/0206512 | A1 | 9/2007 | Hinds et al. | 370/254 |
| 2007/0237092 | A1 * | 10/2007 | Balachandran et al. | 370/254 |
| 2007/0245033 | A1 * | 10/2007 | Gavrilescu et al. | 709/230 |
| 2009/0168643 | A1 * | 7/2009 | Jin et al. | 370/222 |
| 2009/0318138 | A1 * | 12/2009 | Zeng et al. | 455/431 |
| 2010/0214953 | A1 * | 8/2010 | Barnum | 370/254 |

FOREIGN PATENT DOCUMENTS

WO WO 2007/144788 A2 12/2007

OTHER PUBLICATIONS

Bhatnagar, A., et al., "Layer Net: A New Self-Organizing Network Protocol", © 1990 IEEE, pp. 845-849.

(Continued)

*Primary Examiner* — Hassan Phillips
*Assistant Examiner* — Saba Tsegaye
(74) *Attorney, Agent, or Firm* — Harrington & Smith

(57) ABSTRACT

Method for switching to an appropriate network topology type in a telecommunication network including of a node (b) sending to a further node a message (M1) including of a discovery request, receiving from further nodes of the telecommunication network messages (M3, M11) including of discovery results, thereafter, sending a message (M5) including of a proposal of a network topology type and switching to an appropriate network topology type.

20 Claims, 10 Drawing Sheets

701

| originator | a | | | | |
|---|---|---|---|---|---|
| responding nodes | a | b | c | d | e |
| egress | no | no | no | no | yes |
| suggested mode (7100) | daisy chain | | | | |
| suggested route (7010) | a | b | c | d | e |

702

| originator | a | | | | |
|---|---|---|---|---|---|
| responding nodes | a | b | c | d | e |
| egress | no | no | no | no | yes |
| suggested mode (7200) | daisy chain | | | | |
| suggested route | b | c | d | e | |

(56) References Cited

OTHER PUBLICATIONS

Susanta Datta, Ivan Stojmenovic: "Internal Node and Shortcut Based Routing with Guaranteed Delivery in Wireless Networks", Cluster Computing 5, 2002, pp. 169-178, XP002691358, Retrieved from the Internet; [retrieved on Jan. 30, 2013]* abstract * * Sections 1-4 * * figure 4 *.

Xi Wang et al: "Infrastructure's Location Aware Configuration for Sensor Networks" Mobile Computing Systems and Applications, 2004. WMCSA 2004. Sixth IEE E Workshop on Windermere, Cumbria, UK Dec. 2-3, 2004, Piscataway, NJ, USA,IEEE, Dec. 2, 2004, pp. 174-183, XP010757457, ISBN: 978-0-7695-2258-6 * abstract * * Section 3 *.

Xiaoli Ma et al: "An Efficient Path Pruning Algorithm for Geographical Routing in Wireless Networks", IEEE Transactions on Vehicular Technology, IEEE Service Center, Piscataway, NJ, US, vol. 57, No. 4, Jul. 1, 2008, pp. 2474-2488, XP011224280,ISSN: 0018-9545, DOI: 10.1109/TVT.2007.912332 * abstract * * Sections I-111 *.

* cited by examiner

*mesh*

*daisy chain*

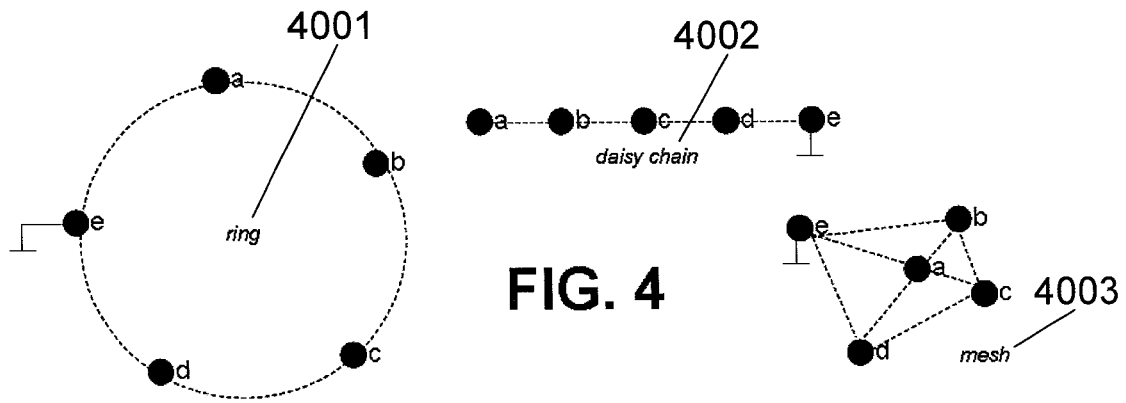
FIG. 4
FIG. 5
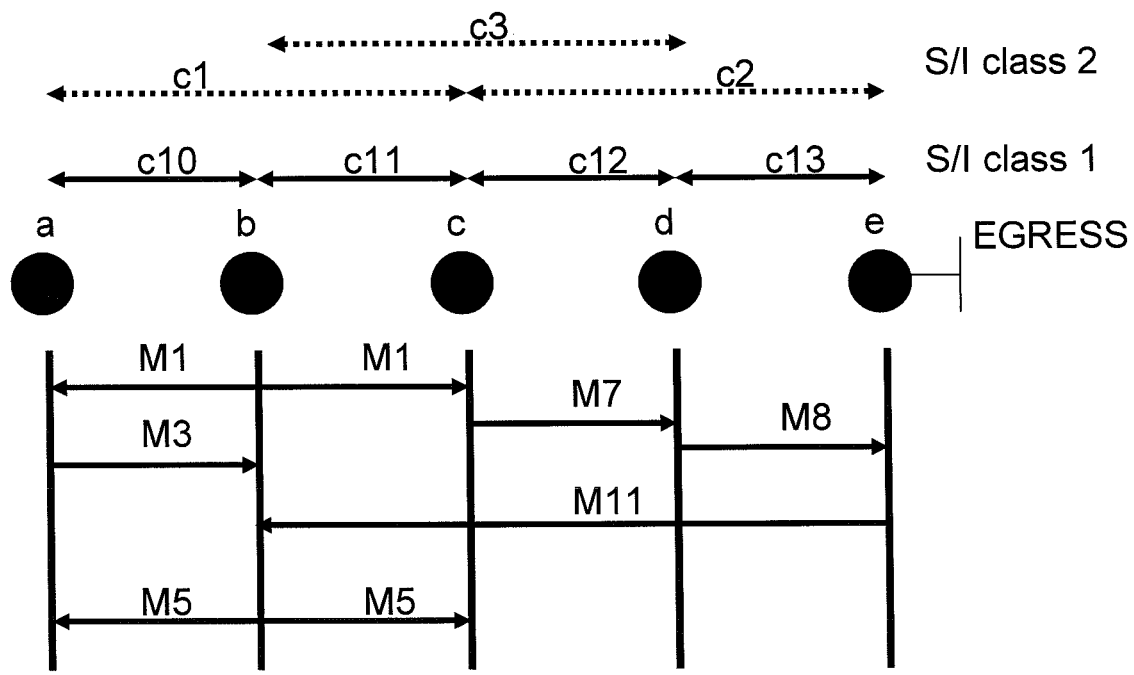

Table 601:

| originator | b | direction | east | | |
|---|---|---|---|---|---|
| I am | b | - | - | - | - |
| egress | no | - | - | - | - |
| neighbors class 1 | a, c | - | - | - | - |
| neighbors class 2 | d | - | - | - | - |

Table 602 (with 6020 annotation):

| originator | b | direction | east | | |
|---|---|---|---|---|---|
| I am | b | c | - | - | - |
| egress | no | no | - | - | - |
| neighbors class 1 | a, c | b, d | - | - | - |
| neighbors class 2 | d | a, e | - | - | - |

Table 611:

| originator | b | direction | east | | |
|---|---|---|---|---|---|
| I am | b | c | d | e | - |
| egress | no | no | no | yes | - |
| neighbors class 1 | a, c | b, d | c, e | d | - |
| neighbors class 2 | d | a, e | a | c | - |

FIG. 6

Table 612:

| originator | b | direction | west | | |
|---|---|---|---|---|---|
| I am | b | a | - | - | - |
| egress | no | no | - | - | - |
| neighbors class 1 | a, c | b | - | - | - |
| neighbors class 2 | d | c | - | - | - |

Table 620:

| originator | a | direction | east | | |
|---|---|---|---|---|---|
| I am | a | b | c | d | e |
| egress | no | no | no | no | yes |
| neighbors class 1 | b | a, c | b, d | c, e | d |
| neighbors class 2 | c | d | a, e | b | c |

| | | | | | | _701 |
|---|---|---|---|---|---|---|
| originator | a | | | | | |
| responding nodes | a | b | c | d | e | |
| egress | no | no | no | no | yes | |
| 7100 — suggested mode | daisy chain | | | | | |
| 7010 — suggested route | a | b | c | d | e | |

FIG. 7

| | | | | | | _702 |
|---|---|---|---|---|---|---|
| originator | a | | | | | |
| responding nodes | a | b | c | d | e | |
| egress | no | no | no | no | yes | |
| 7200 — suggested mode | daisy chain | | | | | |
| suggested route | b | c | d | e | | |

| | | | | | | _801 |
|---|---|---|---|---|---|---|
| originator | a | | | | | |
| responding nodes | a | b | c | d | e | |
| egress | no | no | no | no | yes | |
| 8100 — suggested mode | ring | | | | | |
| 8010 — suggested route | a | e | - | - | - | |
| 8011 — alternative route | a | b | c | d | e | |

FIG. 8

| | | | | | | _802 |
|---|---|---|---|---|---|---|
| originator | b | | | | | |
| responding nodes | a | b | c | d | e | |
| egress | no | no | no | no | yes | |
| 8200 — suggested mode | ring | | | | | |
| 8020 — suggested route | b | a | e | - | - | |
| 8021 — alternative route | b | c | d | e | - | |

Table 901:

| originator | a | direction | east | |
|---|---|---|---|---|
| I am | a | | | |
| egress | no | | | |
| neighbors class 1 | b, c, d, e | | | |
| neighbors class 2 | - | | | |

Table 902 (9000, 9020):

| originator | | b | direction | east | |
|---|---|---|---|---|---|
| I am | b | c | a | - | - |
| egress | no | no | no | - | - |
| neighbors class 1 | a, c | b, a | b, c, d, e | - | - |
| neighbors class 2 | d | a, e | - | - | - |

Table 903 (9000, 9030):

| originator | | b | direction | west | |
|---|---|---|---|---|---|
| I am | b | a | - | - | - |
| egress | no | no | - | - | - |
| neighbors class 1 | a, c | b, c, d, e | - | - | - |
| neighbors class 2 | d | - | - | - | - |

FIG. 9

Table 1001:

| originator | a | | | | |
|---|---|---|---|---|---|
| responding nodes | a | - | - | - | - |
| egress | no | - | - | - | - |
| suggested mode | mesh | | | | |
| reason | a has too many class 1 neighbors | | | | |

(10100 → suggested mode)

Table 1002:

| originator | b | | | | |
|---|---|---|---|---|---|
| responding nodes | b | c | a | - | - |
| egress | no | no | no | - | - |
| suggested mode | mesh | | | | |
| reason | a has too many class 1 neighbors | | | | |

(10200 → suggested mode)

FIG. 10

| detected nodes | a | b | c | d | e |
|---|---|---|---|---|---|
| mesh | | | | | |
| daisy chain | x | x | x | x | x |
| ring | | | | | |
| resulting mode | daisy chain | | | | |

| detected nodes | a | b | c | d | e |
|---|---|---|---|---|---|
| mesh | x | | | | |
| daisy chain | | x | x | x | x |
| ring | | | | | |
| resulting mode | mesh | | | | |

1102 / 11201 / 11202 / 11203 / 11200

| detected nodes | a | b | c | d | e |
|---|---|---|---|---|---|
| mesh | | | | | |
| daisy chain | x | | | | x |
| ring | | x | x | x | |
| resulting mode | daisy chain | | | | |

1103 / 11300

METHOD, SYSTEM AND NODES FOR NETWORK TOPOLOGY DETECTION IN COMMUNICATION NETWORKS

TECHNICAL FIELD OF THE INVENTION

The present invention relates to network topology detection in communication networks technology, particularly to a method, a network apparatus, a device and a computer readable medium for detecting network topology types in a telecommunication network environment.

BACKGROUND OF THE INVENTION

This invention will enable wireless or wireline mesh networks to detect the network topology they consist of and provide a solution on how to select the best suitable operational mode.

This invention may be applied to the following technology fields, WiFi and WiMAX network technology, mesh and ad hoc network technology, wireless sensor networks, routing and switching technology such as e.g. Ethernet, Microwave technology.

Wi-Fi is the trademark for the popular wireless technology used in home networks, mobile phones, video games and other electronic devices that require some form of wireless networking capability. In particular, it covers the various IEEE 802.11 technologies (including 802.11a, 802.11b, 802.11g, and 802.11n).

WiMAX, meaning Worldwide Interoperability for Microwave Access, is a telecommunications technology that provides for the wireless transmission of data using a variety of transmission modes, from point-to-point links to portable internet access. The technology is based on the IEEE 802.16 standards.

3GPP LTE (Long Term Evolution) is the name to a project within the Second adjacent Generation Partnership Project to cope with future technology evolutions. Goals include improving spectral efficiency, lowering costs, improving services, making use of new spectrum and refarmed spectrum opportunities, and better integration with other open standards.

It has become an important topic for wireless cellular communication such as WiMAX and LTE to integrate multi-hop capability by deploying relay stations (RS). For example, IEEE has established a relay workgroup in order to introduce relay stations into systems based on IEEE 802.16 standards.

Mesh networking is a way to route data, voice and instructions between nodes. It allows for continuous connections and reconfiguration around broken or blocked paths by hopping from node to node until the destination is reached. A mesh network is considered to be a set of randomly arranged wireless nodes which are able to setup connections to adjacent nodes without special manual care taking required. The nodes will configure themselves in a way that optimal routes are setup by employing packet based routing schemes on Data Link or Network Layer of the Open System Interconnection (OSI) reference model.

Setting up a mesh configuration may be necessary when the nodes may are placed in a complete disordered manner. This may happen during setup phase of a communication network or when nodes drops or links are broken randomly.

Mesh networks can be seen as one type of ad hoc network. Mesh networks are self-healing: the network can still operate even when a node breaks down or a connection goes bad as it may happen that the whole set of nodes or a significant number of nodes arrange themselves in a more ordered way. As a result, a very reliable network is formed. This concept is applicable to wireless networks and wired networks.

Wireless mesh networks are the most popular representatives of mesh architectures. The mesh nodes may also support multiple radio cards, each operating at a different example given frequency, code or timeslot.

Mesh routing and switching protocols are subject of standardization, mainly in IEEE 802.11 s and IEEE 802.16j.

A wireless ad hoc network is a decentralized wireless network. The network is ad hoc because each node is willing to forward data for other nodes, and so the determination of which nodes forward data is made dynamically based on the network connectivity conditions. This is in contrast to wired networks in which routers perform the task of routing.

A wireless sensor network (WSN) is a wireless network consisting of spatially distributed autonomous devices using sensors to cooperatively monitor physical or environmental conditions, such as temperature, sound, vibration, pressure, motion or pollutants, at different locations Ethernet is a family of networking technologies for local area networks (LANs). It defines a number of wiring and signaling standards for the Physical Layer of the Open Systems Interconnection (OSI) reference model, through means of network access at the Media Access Control (MAC) of the Data Link Layer (DLL), and a common addressing format. Ethernet is standardized as IEEE 802.3.

Microwave radio relay is a technology for transmitting digital and analog signals, such as long-distance telephone calls and the relay of television programs to transmitters, between two locations on a line of sight radio connection.

Networks are arranged in daisy chain manner when each node is connected in series to the next. If a message is intended for a node down the line, each node forwards it along in sequence until it reaches the destination.

By connecting the nodes arranged in daisy chain manner at each end, a ring topology can be formed. An advantage of the ring is that the number of transmitters and receivers can be cut in half, since a message will eventually loop all of the way round. When a node sends a message, the message is processed by each node in the ring. If a node is not the destination node, it will pass the message to the next node, until the message arrives at its destination. If the message is not accepted by any node in the network, it may travel around the entire ring and return to the sender.

The document EP000115476 Hauenstein et al discloses a method for e.g. virtual local area network, building up topology data base describing network topology based on reported received topology descriptors by central host.

In today's fixed and wireless communication networks there is most often a constellation where data forwarding nodes have connectivity to more than one or two adjacent nodes which allows more than one option or choice for routes.

A typical example is a routed network where one IP router has connectivity to many IP routers, so packets transferred from one peer end of a network to another peer end of the network may use different routes across the network utilizing different IP routers, in the extreme case for each packet.

Another example is an Ethernet network where packets may cross different switches, hubs or bridges of a layer 2 network.

Whenever there is more than one choice of routes to choose between the number of possible routes scales up dramatically with the number of nodes involved—but still there may be only one of these routes which is optimal in terms of QoS and reliability for each connection and only the selection of all the best possible routes for all connections will allow to run the whole network appropriately.

It is one of the most innovative areas to find clever algorithms to determine the optimal routes, and there are a lot of algorithms and methods on how to achieve this.

In routed networks there are different variations of routing protocols engaged which can be classified into proactive routing protocols such as OLSR (optimized link state routing), reactive routing protocols such as DSR (dynamic source routing) and hybrid routing protocols such as ZRP (zone routing protocols)

The algorithms behind are manifold and are specialized for different use cases each having there own pros and cons.

There are numerous ways on how to best handle path finding and mesh configuration. One prominent example on how to deal with both, path finding and dynamic changes is the Hybrid Wireless Mesh Protocol (HWMP) as recommended by IEEE 802.11s. Here a combination of proactive (long haul) and reactive (local) routing protocol is engaged to best cope with mesh problems.

In case of point-to-point wireless connections even more techniques can be applied, such configurations are typically used for microwave links. In general, depending on the nature of the air interface, a carrier, a timeslot (Time Division Multiple Access) or a frequency (Frequency Division Multiple Access) is dedicated to a link.

However, point-to-point connections are considered to be employed in static environments, manually configured, where as highly dynamic systems are considered to be employed in mesh or adhoc networks environments.

Route and path finding in adhoc or mesh networks may be deployed in municipal networks, emerging countries, new players setting up competitive access networks but also industry environment like wireless metering and sensor networks.

Selecting the best possible route is even more important if the nodes are connected via links which may show instability or changing quality like wireless links. Furthermore, additional challenges arise when the connectivity between the different nodes changes frequently i.e. because new nodes are added or removed, nodes are moved or radio conditions change.

This is typical for so called mesh networks and adhoc networks—wireless connection nodes are rearranged occasionally so the routes may change frequently. In this case, in addition to the known route-finding problem the issue of high dynamic comes on top.

Mesh technologies differentiate themselves towards the state-of-the-art technologies by being very dynamic in terms of packet delivery and route finding—which may mean each packet taking a different route.

A typical example of a non meshed technology may be distinct point-to-point connections, i.e., nodes are interconnected by fixed links and all the traffic from one edge of the network to another edge of the network will use fixed routes which are predefined by fixed links. A terminology commonly used for this type of setup is "switched mesh" indicating that one node may have connections to more than two other nodes. However, the traffic will always use the same routes unless a link is broken.

"Switched mesh" is mainly used in static scenarios with no change of topology where as real mesh is used in highly dynamic environments.

The use of resources, especially in case of wireless telecommunication networks environments, is extremely different for meshed and non-meshed use cases.

Using mesh technologies in telecommunication environments requires a per-packet handling with frequent update of the routing tables, high meshing overhead, additional delay caused by mesh but provides highly dynamic but self healing capabilities.

The non-mesh telecommunication environment provides continuous availability of links, stable quality of service (QoS), no or minimum delay, quasi circuit switched mode and no or few flexibility.

This invention provides a method which allows operating in an optimized topology mode once mesh systems are setup.

It may be advantageous, not to use mesh mechanism when networks are arranged in daisy chain manner as the traffic may only be forwarded along the chain there. The use of meshing or routing schemes does not necessarily provide the most effective network connection for these scenarios. Instead it may be more advisable to setup fixed point-to-point connections, so the spare resource of the air interface may be utilized best.

There are also other configurations which predict a use of the air interface different to typical mesh and it may advantageous using the best suitable setup.

But before the best suitable mode as e.g. mesh, non mesh, circuit switched or routed can be employed, the telecommunication network in part or in total may be able to recognize what sort of network topology will apply to it. The task of the present invention is the detection of a network topology type and employing of an appropriate network topology mode in a telecommunication network environment.

SUMMARY OF THE INVENTION

According to an exemplary embodiment of the present invention a network apparatus, a device, a method and a computer readable medium is provided for detecting network topology types in a telecommunication network environment.

The term "network apparatus" may comprise any apparatus in a network, which may comprise a locally fixed installed apparatus and a mobile apparatus and may comprise several devices. A device may be provided with software and hardware which empower the device acting as a node of the telecommunication network. A node could be an access node such as a base station, a network controller, a relay station or an access point, a switching node, a fixed or mobile terminal, computer equipment, or a server.

The telecommunication network is exemplary considered to be a set of randomly arranged wired and wireless nodes which may able to setup connections to adjacent nodes without special manual care taking required. The nodes may configure themselves in a way that optimal routes may be setup by employing packet based routing schemes on Data Link or Network Layer of the Open Systems Interconnection (OSI) reference model.

According to an exemplary embodiment of the present invention in a wired or wireless telecommunication network nodes may arrange themselves and negotiate optimal paths for data forwarding after power on or after changes in network such as reconfiguration, augmentation or failure.

According to an exemplary embodiment of the present invention wireless and wireline mesh networks may be enabled to detect the network topology they consist of and a solution on how to select the best suitable operational mode may be provided.

When setting up a mesh configuration it may happen that the whole set of nodes or a significant number of nodes arrange themselves in a more or less ordered way. According to a further exemplary embodiment of the present invention a daisy chain environment may be detected and thus fixed point-to-point connections may be setup in a manner that the spare resources of the air interface may be utilized best.

According to a further exemplary embodiment of the present invention a configurations which may predict a use of the air interface resources different to typical mesh may be decided for parts of or the total telecommunication environment and the best suitable configuration may setup such as a daisy chain or a ring configuration.

According to an exemplary embodiment of the present invention the object of the present invention is achieved by three different technical phases: initiation of network topology discovery, autonomous evaluation of discovery probes, autonomous switch to appropriate network topology mode.

The network topology discovery may be initiated when one node or several nodes discover a change in the system which may happen when an adjacent node has disappeared, a new adjacent node has been inserted, the link quality has changed, the traffic volume has changed, or a discovery message of an adjacent node has received. The solution for the topology detection may be applied in data and in voice network environments. Particularly it may be applied in fixed and wireless environments.

The topology discovery procedure may evaluate the discovery probes autonomously in the second phase and may propose a network topology mode best suitable according to its analysis and may communicate it to other nodes.

The resulting network topology decision and the switch to appropriate network topology mode may be based on a list of node proposals received by further nodes during the second phase.

According to an exemplary embodiment of the present invention the object of the present invention is achieved by a node having means for performing the three different phases: initiation of network topology discovery wherein a node may send a discovery probe, autonomous evaluation of discovery probes wherein a node may analyse the results from discovery probes and may send a proposal comprising of a network topology mode, and autonomous switching to an appropriate network topology wherein at least one or each node may switch to an appropriate network topology.

According to an exemplary embodiment of the present invention a node of the plurality of nodes may send a message comprising of a discovery probe to at least one of the further nodes, may send to at least one of the further nodes a message comprising of a proposed network topology of operation, and may have means for switching to an appropriate network topology mode.

According to an exemplary embodiment of the present invention the method for detecting network topology types in a telecommunication network environment is characterized by an initiating node detecting its network topology by broadcasting a discovery probes to adjacent nodes, receiving results from discovery probe from at least one of the nodes of the telecommunication network and sending to at least a further node a first information comprising of a proposed network mode.

In a telecommunication network environment, where data forwarding nodes may be arranged in a more or less random manner, the nodes may be able to detect whether they are arranged completely disordered as example given in a mesh topology or whether they may partly or in total arranged according to a specific network topology as example given in a daisy chain topology allowing simpler and more efficient use of forwarding resources and allowing even resilient paths as exemplary a ring topology. The network topology detection may happen by broadcasting a discovery probe to adjacent nodes which may add information about themselves and their adjacent nodes and forwarding it to other adjacent nodes.

According to an exemplary embodiment of the present invention the discovery probe may be sent back to the initiating node by an edge node of the network wherein an edge node is a node that may serve as an egress to the backbone network.

According to an exemplary embodiment of the present invention the discovery probe may be sent back to the initiating node by a further node of the network wherein a further node is a node having more than two adjacent nodes.

According to an exemplary embodiment of the present invention the initiating node may further comprise of the functionality to analyze the discovery probe received from at least one of the nodes of the telecommunication network, and may calculate the proposed network mode.

As a result of the network topology detection of the present invention, nodes may apply network topology optimized resource use such as per packet routing for mesh topology or point-to-point for daisy chain or ring topology.

As each node of the plurality of nodes may perform this procedure, each node of the telecommunication network may have a list comprising of adjacent node information of a part of or of the whole telecommunication network.

The second phase comprises of autonomous evaluation of discovery probes. Each node of the plurality of nodes may analyse the list comprising of node information of a part of or of the whole telecommunication network and may propose a topology mode best suitable according to its analysis and may communicate it to at least one further node. In a further exemplary embodiment of the present invention the proposed network topology mode may be communicated to all further nodes.

According to an exemplary embodiment of the invention a node of the plurality of nodes may further receive the proposed network topology mode from at least one of the further nodes and may switch to an appropriate network topology mode of operation depending on proposed network topology of at least one of the further nodes in particular one of the adjacent nodes.

According to an exemplary embodiment of the present invention the resulting network topology decision and the switch to appropriate network topology mode may be based on a list of mode proposals received from at least one further node.

In a further exemplary embodiment of the present invention each node of the telecommunication network may have a list comprising of the proposed network topology from all nodes of the telecommunication network.

According to a further exemplary embodiment of the present invention the provided network topology modes may be ranked and the appropriate network topology mode of operation may result in the least ranked mode if one or more proposed network topology mode of the adjacent nodes differ from the own proposed network topology mode.

According to a further exemplary embodiment of the present invention the resulting which is the final network topology decision may be based on a least-common-denominator-principle wherein the telecommunication network system or parts of it may operate in the proposed mode according to the list of mode proposals when all nodes propose the same mode and the telecommunication network system or parts of it may operate in the least ranked mode when one or more nodes differ in their network topology proposal.

Since all nodes may communicate their network topology proposal to all other nodes each node may switch to the suitable mode individually without further communication since the rules for decision are unambiguous for all nodes following the least-common-denominator-principle.

According to an exemplary embodiment of the present invention the appropriate mode of operation may result in a daisy chain mode and the nodes may use at least two different radio bearers.

According to an exemplary embodiment of the present invention a further node may receive a discovery probe from an initiating node, may analyze its connections to adjacent nodes, and may add information about the connectivity to its adjacent nodes to the discovery probe.

According to an exemplary embodiment of the present invention a further node may broadcast a discovering probe to its adjacent nodes depending on the result of its connectivity analysis.

According to a further exemplary embodiment of the present invention the result of the analysis may turn out that the further node may have connectivity with a certain quality to two adjacent nodes and may send the discovery probe to at least one further node of the telecommunication network.

According to a further exemplary embodiment of the present invention the telecommunication network may belong to a mesh network environment.

According to an exemplary embodiment of the present invention a daisy chain operating procedure may be provided wherein the nodes skip their direct adjacent nodes and forward data to the over-next node instead of forwarding to their direct adjacent nodes.

According to an exemplary embodiment of the present invention a method for operating a network topology type "daisy chain" in a telecommunication network environment may be provided characterized by a first node, a second node, a third node, a fourth node and a fifth node having the capability using at least two different radio bearers, a second node being adjacent to first node and to a second adjacent node, a fourth node being adjacent to a third node and a fifth node, and wherein a third node forwards data directly to a first node using a first radio bearer, a fifth node forwards data directly to the third node using a second radio bearer and a second node forwards data directly to the fourth node using a third radio bearer.

According to a further exemplary embodiment of the present invention a new daisy chain operating procedure may be provided wherein the data may be forwarded without interference to the adjacent nodes. This may be achieved when using three individual carriers which may be arranged in a corresponding manner. According to a further exemplary embodiment of the present invention the nodes may use up to three different radio bearers which may be separated by frequency, by time or by code.

According to a further exemplary embodiment of the present invention each node may have the capability to operate in at least two out of three carriers in parallel.

According to a further exemplary embodiment of the present invention each node may be provided as a WiFi access point with directed or sectorized antennas which point at their eastern and western adjacent nodes.

According to a further exemplary embodiment of the present invention the carriers may be provided according to IEEE 802.11b/g.

According to a further exemplary embodiment of the present invention each node may skip its direct adjacent node as long as the operation mode is normal mode because no node may fail. The normal operation mode may employ a frequency reuse of three to avoid interference.

According to a further exemplary embodiment of the present invention each access point may use specific service set identifiers (SSID), wherein the service set identifier of the forwarding data may be associated to the over-next adjacent node and not to the skipped one in order to ensure the appropriate associations.

According to a further exemplary embodiment of the present invention traffic feeding in may be generated locally at the node wherein the node may be an access point.

When in normal operation, a configuration may apply with each access point forwarding the traffic of its adjacent nodes along the chain while feeding in traffic generated locally at the access point. In normal operation mode all access points skip their direct adjacent nodes employing a frequency reuse of three to avoid interference.

According to a further exemplary embodiment of the present invention an operating procedure may be provided upon adding resilience to the daisy chain system wherein direct adjacent nodes may take over the role of failed nodes.

According to a further exemplary embodiment of the present invention the new operating procedure of a daisy system may fix the failure by a transparent resilience mode wherein direct adjacent nodes may take over the role of the failed node towards the effected adjacent nodes in such a way that they appear as working closest the failed node towards them. The affected direct adjacent node need not notice that their forwarding node has failed as the direct adjacent nodes of the failed node may be taken over its role.

According to another exemplary embodiment of the present invention the new operating procedure of a daisy system may fix the failure by a non-transparent resilience mode wherein direct adjacent nodes will communicate with affected nodes and negotiate the future reuse of air interface resources.

According to a further exemplary embodiment of the present invention an operation mode for daisy chain systems may be provided allowing high throughput while still providing high resilience characterized by the nodes skipping their direct adjacent nodes allowing direct adjacent nodes to act as resilient nodes operating in two modes, one leaving affected nodes unaware of a node failure and another actively involving affected nodes.

According to an exemplary embodiment of the present invention a method for operating a network topology type daisy chain in a telecommunication network environment may be provided characterized by a first node which may be affected, a second node which may be adjacent, a third node which may be the detecting one, a fourth node which may be the corresponding second adjacent node and may be the failing one, and a fifth node which may be the corresponding second affected node. The third node which may the detecting node, may work in the following manner: the third node may detect a link failure to the fourth node, the third node may send a link failure detection to the fifth node and may establish a transparent transmission to the fifth node. The establishing of a transparent transmission to the fifth node may be characterized by receiving an acknowledge message of a link failure detection message from the fifth node and switching into transparent resilience mode. The transparent resilience mode may be characterized by receiving traffic from second node on a third radio bearer and forwarding traffic from a third node to a fifth node.

According to a further exemplary embodiment of the present invention a third node may further comprise: detecting a link failure to fourth node, sending link failure detection to fifth node and establishing a non-transparent transmission to fifth node wherein the non-transparent transmission at a third node may be characterized by receiving an acknowledge message to link failure detection message from fifth node and switching into non-transparent resilience operation mode wherein switching takes place by sending to a second node a message comprising of an information about switching into non-transparent resilience operation.

According to a further exemplary embodiment of the present invention the method comprises of negotiating which carrier is used for forwarding the data between the first node and the third node, negotiating which carrier is used for forwarding the data between the third node and the fifth node, and negotiating which carrier is used for forwarding the data between the second node and the fourth node.

According to a further exemplary embodiment of the present invention the failing of a node may be detected by an adjacent node. The detecting node may report its suspect to the corresponding second adjacent node of the failing node and may indicate that, by its design, it is able to handle transparent resilience mode, non-transparent resilience mode or both transparent and non-transparent resilience mode.

According to a further exemplary embodiment of the present invention the failing of a node may be detected by not receiving signals any longer.

According to a further exemplary embodiment of the present invention an adjacent node to a failing node may have up to three radio heads which may provide handling of up to three carriers in parallel.

According to a further exemplary embodiment of the present invention the corresponding second adjacent node of the failing node may search for the failing node upon receipt of the message of the detecting node and may acknowledge its unavailability. The corresponding second adjacent node of the failing node may have the same design and thus it may be of the same kind as the detecting node and may suggest using the transparent resilience mode.

According to a further exemplary embodiment of the present invention the detecting adjacent node of the failing node may have received an acknowledgement message from the corresponding second adjacent node of the failing node, may have sent a confirmation message to the corresponding second adjacent node and thereafter both nodes may switch to a transparent resilience mode.

According to a further exemplary embodiment of the present invention nodes operating in transparent resilience mode may continue to forward traffic from or to their over-next node and these nodes may leave the radio configuration unchanged.

In addition, both nodes the detecting node as well as the corresponding second adjacent node of the failing node now may provide an air interface to the affected nodes which is shaped in exactly the same manner as it was by the failing node. The detecting adjacent node may use the SSID of the failing node towards its still operating adjacent node and may employ the same carrier as its direct adjacent node had towards the failing node.

Accordingly, the corresponding second adjacent node of the failing node may use the SSID of the failing node towards its still operating adjacent node and may employ the same carrier as its direct adjacent node may used to towards the failing node. This way the two affected nodes do not need to notice that their forwarding node was replaced by the two direct adjacent nodes of the failing node. The behavior of the nodes operating in transparent resilience mode may be transparent for the affected adjacent nodes. The affected adjacent nodes need not change their operating mode.

According to a further exemplary embodiment of the present invention the direct adjacent nodes may negotiate non-transparent resilience mode and both detecting nodes of the failing node may send a message to the corresponding second adjacent node, both direct adjacent nodes may inform the corresponding affected nodes about the failing node. The affected nodes acknowledge and establish a non-transparent transmission. According to a further exemplary embodiment of the present invention wherein the same carrier may be used between direct adjacent nodes of the failing node and the affected nodes as was used between the affected nodes and the failing node to avoid interference.

According to another exemplary embodiment of the present invention an affected node forwarding or receiving data to failing node, may detect the failing node and may inform the direct adjacent node of the node failing.

According to another exemplary embodiment of the present invention the nodes may provide different radio resource capabilities. A mixed operation of nodes supporting single carrier and of nodes supporting multi-carrier may be provided.

According to another exemplary embodiment of the present invention the method of operating may be of network topology mode "daisy chain" and may be applied to any existing air interface operating in a licensed or an unlicensed band.

According to an exemplary embodiment of the present invention a communication node for detecting network topology types in a telecommunication network environment may be characterized by detecting its network topology by broadcasting a discovery probe to adjacent communication nodes, receiving results from discovery probe from at least one of the adjacent communication nodes and sending to at least one of the adjacent nodes a first information comprising of a proposed network mode.

According to an exemplary embodiment of the present invention a network apparatus in a telecommunication network may comprise at least a first node, a second node, a third node, a fourth node and a fifth node connected in sequence order to the next characterized by operating in a network topology mode daisy chain, having the capability using at least two different radio bearers, the third node being adjacent to the second node and to the fourth node, the third node forwarding data directly to the first node operating in a first radio bearer and the fifth node forwarding data directly to the third node operating in a second radio bearer, the third node detecting a link failure to fourth node and sending link failure detection to fifth node the third node receiving an acknowledge message to link failure detection message and the third node having means for establishing a transmission to fifth node.

According to a further exemplary embodiment of the present invention a third node and a fifth node adjacent to a fourth node take over the role of a fourth node when detecting the link failure to the fourth node.

According to a further exemplary embodiment of the present invention the role of the fourth node may be taken over by the thirdx node and the fifth node in such way that it appears as the fourth node in transparent manner to the second node and the sixth node, direct adjacent to the fifth node.

According to a further exemplary embodiment of the present invention the role of the fourth node may be taken over in such way that it appears as fourth node in non-transparent manner to the second node and the sixth node.

According to a further exemplary embodiment of the present invention the nodes may be WiFi or WiMAX access points or nodes of the Long Term Evolution technology.

According to a further exemplary embodiment of the present invention a node may operate as an egress node having access to data backbone telecommunication network.

According to a further exemplary embodiment of the present invention the information list may be analysed by each node and the best suitable network topology mode may be derived from results of the analysis.

According to a further exemplary embodiment of the present invention the results of analysis may be communicated to all other nodes or part of the nodes of the telecommunication network system.

According to a further exemplary embodiment of the present invention all nodes may communicate their proposal to all further nodes and each node may switch to the appropriate network topology mode individually without further communication.

According to a further exemplary embodiment of the present invention the rules for decision may be unambiguous for all or part of the nodes. The node may follow the least-common-denominator-principle.

Exemplary embodiments of the present invention will be described in the following with reference to the following drawings.

BRIEF DESCRIPTION OF THE DRAWINGS

FIG. 4 shows different network topology types.

FIG. 5 shows an exemplary message flow between the nodes during network topology detection phase of the present invention.

FIG. 6 shows an exemplary embodiment of a discovery probe which may have the format as shown in the present invention during initiation phase of network topology discovery.

FIG. 7 shows an exemplary embodiment of a network topology proposal which may be setup as shown in the present invention at the end of discovery procedure.

FIG. 8 shows another exemplary embodiment of a network topology mode proposal which may be setup for a ring configuration as shown in the present invention at the end of discovery procedure.

FIG. 9 shows an exemplary embodiment of a discovery probe which may have the format for a completely disordered as shown in the present invention during initiation phase of network topology discovery.

FIG. 10 shows another exemplary embodiment of a network topology mode proposal which may be setup for a mesh configuration as shown in the present invention at the end of discovery procedure.

FIG. 11 shows another exemplary embodiment of a decision matrix which may be used for the final network topology decision of as shown in the present invention.

DETAILED DESCRIPTION

To further clarify the objects, technical schemes and advantages of the present invention, the present invention is further described in detail with reference to the accompanying drawings and embodiments. It needs to be pointed out that the embodiments described here are merely for the purposes of illustrating the present invention; they are not to be understood as limiting the present invention.

Figure 1:
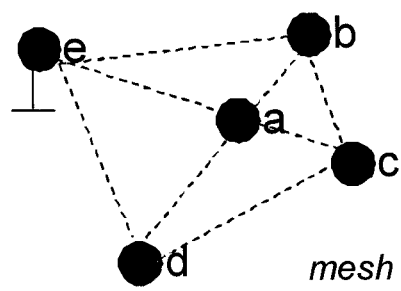
FIG. 1 shows an exemplary embodiment of a telecommunication network, in particular a mesh network having a plurality of comprising nodes.

FIG. 1 shows an exemplary embodiment of a communication network, in particular a mesh network comprising of nodes a, b, c, d, e. This is a typical arrangement of a wireless mesh environment. The nodes of the network communicate with each other, with a common transmission medium being used, for example a common fixed wired line or a common radio frequency. Dotted lines connect adjacent nodes to each other, in other words those nodes, which can communicate directly with each other. The node a is adjacent to the nodes b, c, d and e, the node b is adjacent to the nodes a, c and e, the node c is adjacent to the nodes a, b and d, the node d is adjacent to the nodes a, c and e, the node e is adjacent to the nodes a, b and d. The invention is preferably deployed in larger networks as the one shown in FIG. 1.

After initialization, these nodes will arrange themselves and negotiate optimal paths for data forwarding. The result of arrangement may be a mesh mode when the nodes are setup in completely random manner or a daisy chain when nodes are ordered in subsequent manner as shown in FIG. 2.

However, even when connections between the nodes breaks, it may happen that the whole set of nodes or a significant number of nodes arrange themselves in a more ordered way again.

Figure 2:
FIG. 2 shows an example where nodes are arranged in a sequence (daisy chain) manner.

FIG. 2 shows an example where nodes are arranged in a daisy chain manner when connecting each node in series to the next and the traffic can only be forwarded along the chain. Dotted lines connect adjacent nodes of the chain to each other, in other words those nodes, which can communicate directly with each other. The node a is adjacent to the node b, the node b is adjacent to the nodes a and c, the node c is adjacent to the nodes b and d, the node d is adjacent to the nodes c and e, the node e is adjacent to the node d. Node d may have an egress interconnecting to an adjacent communication network which could be an access point of another mobile network. The invention is preferably deployed in larger networks as the one shown in FIG. 2.

For these networks as described exemplary for daisy chain scenarios, the use of meshing or routing schemes would be an effort that exceeds the desired goal. Hence, it would be more advisable to setup fixed point-to-point connections, so the spare resource of the air interface can be utilized best.

There are even more configurations which predict a use of the air interface different to typical mesh and it seems to be very promising to always use the best suitable setup.

Figure 3:
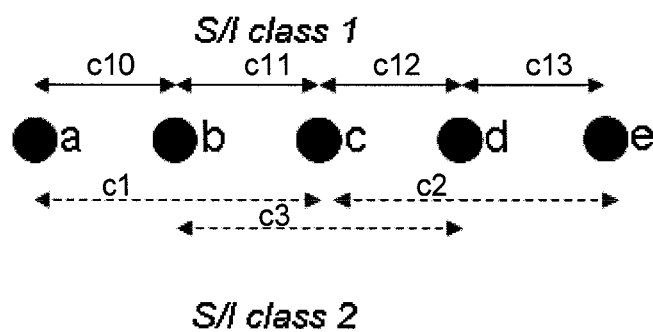
FIG. 3 shows the relationship to adjacent nodes depending of the quality of the connection.

FIG. 3 shows the relationship to adjacent nodes in terms of quality concerning their connection. Whatever air interface is used and whatever network topology is given, one node may see more than direct adjacent nodes. Adjacent nodes may be classified in terms of quality, e.g. signal to noise ratio (S/I) in case of wireless or bandwidth or bit error rate (BER) in case of wireline connections. In the example of FIG. 3 node c may be connected to nodes b and d with good signal to noise ratio (S/I) which is illustrated by the pulled through line c11 and c12 but the node c may also be connected to nodes a and e with poorer signal to noise ratio (S/I) illustrated by dotted lines c1 and c2. Node b may be connected to nodes a, and c with good signal to noise ratio (S/I) illustrated by the pulled through line c10 and c11 but may also be connected to node d with bad signal to noise ratio (S/I), illustrated by the dotted line c3. Node d may be connected to node c and e with good signal to noise ratio (S/I) illustrated by the pulled through line c12 and c13 but may also be connected to node b with bad signal to noise ratio (S/I), illustrated by the dotted line c3. In this terminology node d may denote nodes c and e as "S/I class 1" adjacent nodes and nodes b as "S/I class 2" adjacent nodes.

FIG. 4 shows different network topology types comprising of a ring, a daisy chain and a mesh network topology mode. A number of nodes (a, b, c, d, and e) may make up a mesh network. In addition, one or several nodes may provide root node functionality which may interconnect to a backbone communication network. In this example node e shall provide egress functionality a root node.

There may be many network topologies that justify a specific resource treatment however exemplary of this invention the mesh, the daisy chain and the ring topologies are depicted.

For the mesh mode, the standard scenario is that nodes are setup in a completely random manner and each node may communicate with a couple of adjacent nodes.

For the daisy chain mode, nodes are ordered in a subsequent manner and the traffic is forwarded along the chain, i.e. west to east from node a to node b to node c to node d to node e.

For the ring mode, a specific case of the daisy chain arrangement, however, alternative routes are possible either clockwise or counter clockwise.

FIG. 5 shows the relationship to adjacent nodes in terms of quality concerning their connection and an exemplary message flow between the nodes of the present invention. Whatever air interface is used and whatever topology is given, one node may see more than direct adjacent nodes. Adjacent nodes may be classified in terms of quality, e.g. signal to noise ratio (S/I) in case of wireless or bandwidth or bit error rate (BER) in case of wireline connections. Similar as for example of FIG. 3 node c may be connected to nodes b and d with good signal to noise ratio (S/I) which is illustrated by the pulled through line c11 and c12 but the node c may also be connected to nodes a and e with poorer signal to noise ratio (S/I) illustrated by dotted lines c1 and c2. Node b may be connected to nodes a, and c with good signal to noise ratio (S/I) illustrated by the pulled through line c10 and c11 but may also be connected to node d with bad signal to noise ratio (S/I). Node d may be connected to node c and e with good signal to noise ratio (S/I) illustrated by the pulled through line c12 and c13 but may also be connected to node b with bad signal to noise ratio (S/I).

Node b may the initiating node for network topology detection. Thus node b may broadcast a message M1 comprising of a detection probe to its adjacent nodes a and c. Node a may receive the message comprising of the discovery probe from node a, detects that it has no further direct adjacent node except node b where the origin message comes from, and sends back a message M3 comprising of this information to initiating node b. Node c may receive the message comprising of the discovery probe from node b, may add its adjacent nodes information to discovery probe and may forward message M7 comprising of the amended discovery probe information to node d as node d may the only direct adjacent node except initiating node b the origin message comes from. When node d itself receives this message it may add its adjacent node information to discovery probe and may forward message M8 comprising of amended discovery probe to node e as node e may the only direct adjacent node with exception of node c the discovery probe comes from. Node e may receive the message comprising of the discovery probe from node d, may detect that it is an edge node and may send back message M11 comprising of this information to initiating node b.

Alternatively to the message flow of this example node c may already be performed an own investigation on its topology discovery and may send this information directly back to node b.

Node b may analyse the results of discovery probe getting from further nodes and may broadcast a message M5 comprising of a network topology mode proposal, to its adjacent nodes.

This procedure may be initiated from each node of the telecommunication network and thus each node may broadcast a network topology mode proposal.

Figure 5A:
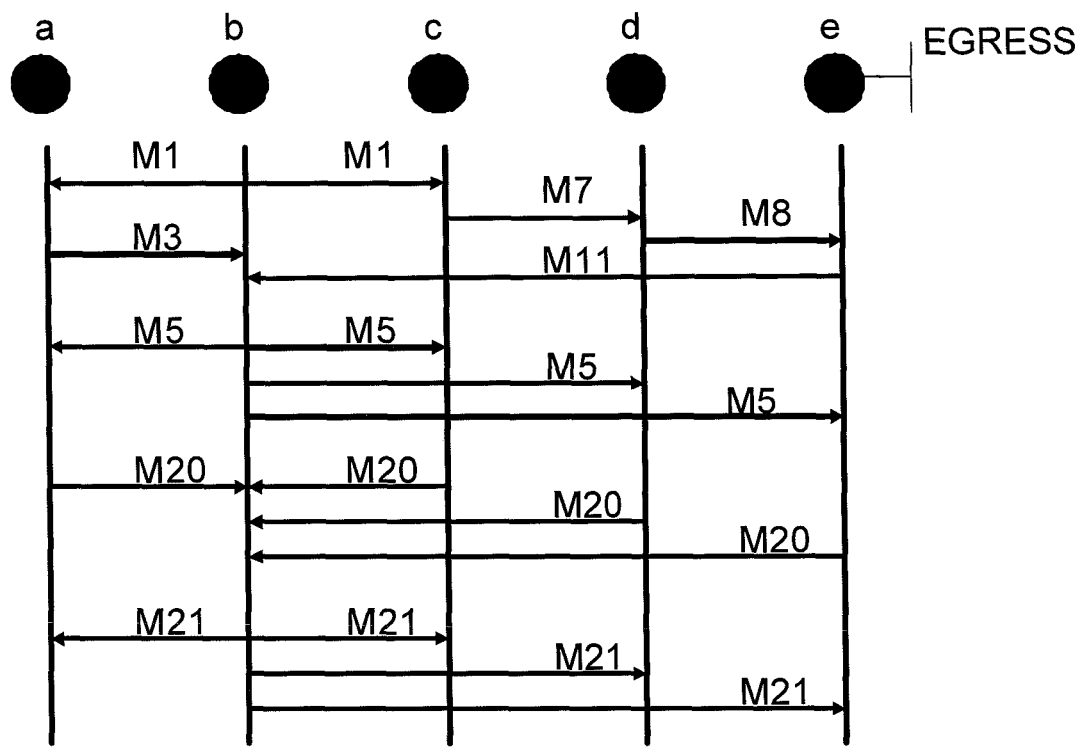
FIG. 5a shows an exemplary message flow between the nodes during the initiation of network topology discovery phase, the autonomous network topology evaluation phase, and the autonomous network topology switching phase of the present invention.

FIG. 5a shows an exemplary message flow between the nodes during the initiation of network topology discovery phase, the autonomous network topology evaluation phase, and the autonomous network topology switching phase of the present invention.

The initiation of network topology discovery phase is already described in detail in FIG. 5 comprising of the message flow M1, M7, M8, M3, and M11. The nodes may have the same role as described in FIG. 5.

During the autonomous evaluation phase, the initiating node b may analyse the results from discovery probe and may setup a network topology proposal based on results getting from the further nodes. At the end of this procedure the node b may send to the further nodes, node a, node c, node d, and node e, the message M5 comprising of a network topology mode proposal.

Node b may also receive from the further nodes a, c, d, and e, the messages M20 comprising of further network topology proposals. The message M20 may be received after, before or at the same time when node b may send its network proposal message M5.

The network topology types may be ranked and the resulting topology type of operation may be the least ranked topology type if one or more proposed network topology types received from the further nodes differ from the own proposed topology type.

The initiating node b may send to the further nodes, a, c, d, and e, the messages M21 comprising of the resulting network topology type, and may switch to this network topology type.

FIG. 6 shows an exemplary embodiment of a discovery probe which may have the format as shown in the present invention during initiation phase of network topology discovery. Each node may send these probes but it will also be the recipient of probes of others. If it is recipient, it may fill in the requested information and forward the probe to other adjacent nodes but not back to the node having sent this probe. If the node has only one adjacent node (from whom it received the probe) it will send the probe back to the originator since it considers itself being an edge node. If the node has more than two adjacent nodes it shall not forward the probe any further but send it back to the originator assuming it is in a completely disordered and setup mesh is the best suitable mode. If it has only one adjacent node, it shall assume it is an edge node. When it has two adjacent nodes it shall send out probes to both of them to derive their adjacent node situation. For descriptive reasons, the two adjacent nodes are denoted as east and west adjacent node. After a while, each node will receive back the probes form its east and west neighbors with all the requested data filled in.

In a further exemplary solution of the invention a node may classify its adjacent nodes according to signal to noise (S/I) into class 1 "neighbors class 1" and class 2 adjacent nodes "neighbors class 2". If the node has more than two class 1 adjacent nodes it may not forward the probe any further but send it back to the originator assuming it is in a completely disordered setup mesh is the best suitable mode. When it has two class 1 adjacent nodes it may send out probes to both of them to derive their adjacent node situation. After a while, each node may receive back the probes form its east and west neighbors with all the requested data filled in.

The exemplary embodiment of a probe which may have a format comprising of the information fields originator, direction, "I am", egress, "neighbors class 1" and "neighbors class 2". The field originator may contain identifier of the originator node, the field direction may contain the direction in which probe was sent (east, west), the field "I am" may contain the node identifier which fills in its adjacent node information, the field egress may contain the information whether the concerned node has access to a backbone communication network, the field "neighbors class 1" may contain the identifiers of all adjacent nodes having connection performing at least a certain quality criteria and the field "neighbors class 2" may contain the identifiers of all adjacent nodes having connectivity not fulfilling a certain quality criteria.

The probes are discussed for nodes a, and b in a daisy chain setup similar to example of FIG. 5.

Assuming a daisy chain configuration, node a would send a probe as shown in table 620 eastbound to node b, having filled in its adjacent node information comprising of setting up the field "I am" to a, the field egress to no, the field "neighbors class 1" to b and the field "neighbors class 2" to c. The recipient adjacent node b will then fill in its adjacent node information comprising of setting up the field "I am" to b, the field egress to no, the field "neighbors class 1" to a and c and the field "neighbors class 2" to d and thereafter sent the probe to node c but not to node a as node a was the sender of this probe. This goes on along the daisy chain and the adjacent node c will then fill in its adjacent node information comprising of setting up the field "I am" to c, the field egress to no, the field "neighbors class 1" to b and d and the field "neighbors class 2" to a and e and thereafter sent the probe to adjacent node d but not to node a as node a was the sender of this probe. The adjacent node d will then fill in its adjacent node information comprising of setting up the field "I am" to d, the field egress to no, the field "neighbors class 1" to c and e and the field "neighbors class 2" to b and thereafter sent the probe to adjacent node e but not to node c as node c was the sender of this probe. The adjacent node e being the last node of the chain will then fill in its adjacent node information comprising of setting up the field "I am" to e, the field egress to yes, the field "neighbors class 1" to d and the field "neighbors class 2" to c and thereafter sent the probe back the chain to a as e discovers it is an edge node.

Node a will not send a probe westbound since there are no adjacent node as it is an edge node.

The same procedure is carried out by all other nodes, examples are shown in table 601, 602, 611, 612 of FIG. 6 for node b. Node b will send a probe westbound to a and eastbound to c. Nodes a and e will send the probes back since they are the edge nodes.

When node b may send a probe as shown in table 601 eastbound to node c, having filled in its adjacent node information before comprising of setting up the field "I am" to b, the field egress to no, the field "neighbors class 1" to a and c and the field "neighbors class 2" to d. The recipient adjacent node b will then fill in its adjacent node information 6020 as shown in table 602. This goes on along the daisy chain until node e being the last node of the chain will then fill in its adjacent node information comprising of setting up the field "I am" to e, the field egress to yes, the field "neighbors class 1" to d and the field "neighbors class 2" to c and thereafter sent the discovery probe setup as shown in table 611 back the chain to a as e discovers it is an edge node.

Node b may send a probe westbound to node a as shown in table 612. The recipient adjacent node a will then fill in its adjacent node information comprising of setting up the field "I am" to a, the field egress to no, the field "neighbors class 1" to b and the field "neighbors class 2" to c and thereafter may send the discovery probe back to b as it may discover it is an edge node.

FIG. 7 shows an exemplary embodiment of a network topology mode proposal which may be setup at the end of the discovery procedure when all nodes have been returned their eastbound and westbound probes. The setup table may have a format comprising of the information fields, originator, responding nodes, egress, suggested mode and suggested route. The field originator may contain the identifier of the originator node, the field responding nodes may contain the node identifiers of all nodes responding with network topology discovery information, the field egress may contain the information whether the concerned node may have access to a backbone communication network, the field suggested mode may contain the proposed mode based on the network topology discovery information and the field suggested route may contain forwarding data information.

Table 701 of FIG. 7 shows the setup for node a, comprising of the corresponding nodes a, b, c, d and e, the egress set to no for the nodes a, b, c, d and set to yes for the node e. Node a may setup the suggested mode (7100) to daisy chain and according to the suggested route (7010) setup for node a, node a may forward data to node b, thereafter node b to node c, thereafter node c to node d, and thereafter node d to node e. Node e may the egress node to backbone communication network of this chain.

Table 702 of FIG. 7 shows the setup for node b, comprising of the corresponding nodes a, b, c, d and e, the egress set to no for the nodes a, b, c, d and set to yes for the node e. Node b may setup the proposed suggested mode to daisy chain and node a may forward data from node b to node c, thereafter to node d, and thereafter to node e, according to the suggested route of table 702. Node e may the egress node to backbone communication network of this chain.

The setup table for the nodes c, d and e are not illustrated but setup table may comprise similar format and information.

When all nodes will have the same order of responding nodes, each node may determine its position and route to the next egress. Each node may find out from network topology discovery phase that it is a subsequent chain and thus each node may suggest a daisy chain mode.

FIG. 8 shows another exemplary embodiment of a network topology mode proposal which may be setup for a ring configuration as shown in the present invention at the end of discovery procedure. This exemplary embodiment is similar to the one of FIG. 7.

The difference here is that every node has two adjacent nodes as there is no edge node. For this case nodes may send the probe back to the originator once they see that their target adjacent node has already filled out the information field of the discovery probe. In this particular case each node can choose between two routes, clockwise and counter clockwise and advantageously the shortest path to the egress node as default path and the other as resilient path.

Table 801 of FIG. 8 shows the setup for node a, comprising of the responding nodes a, b, c, d and e, the egress set to no for the nodes a, b, c, d and set to yes for the node e. Node a may setup the proposed suggested mode (8100) to ring and according to the suggested route (8010), node a may forward data to node e and node e may the egress node to backbone communication network. The field alternative route 8011 may provide the resilient path in case of failure. For this case the alternative route may forward data from node a to node b, thereafter to node c, thereafter to node d and thereafter to node e. Node e may the egress node to backbone communication network of this chain.

Table 802 of FIG. 8 shows the setup for node b, comprising of the responding nodes a, b, c, d and e, the egress set to no for the nodes a, b, c, d and set to yes for the node e. Node b may setup the proposed suggested mode (8200) to ring, and according to the suggested route (8020), node b may forward data to node a, and thereafter to the egress node e. The field alternative route 8021 may provide the resilient path in case of failure. For this case the alternative route may forward data from node b to node c, thereafter to node d and thereafter to node e. Node e may the egress node to backbone communication network of this chain.

FIG. 9 shows an exemplary embodiment of a discovery probe which may have the format for a completely disordered communication network as shown in the present invention during initiation phase of network topology discovery.

This is similar to FIG. 6, each node may send discovery probes but it will also be the recipient of discovery probes of further nodes. If it is recipient node, it may fill in the requested information and forward the probe the other adjacent nodes but not back to the node having sent this probe. If the node has more than two adjacent nodes it may not forward the probe any further but send it back to the originator assuming it is in a completely disordered and setup mesh is the best suitable mode. If it has only one adjacent node, it shall assume it is an edge node. When it has two adjacent nodes it shall send out discovery probes to both of them to derive their adjacent node situation. After a while, each node will receive back the discovery probes from its east and west neighbors with all the requested data filled in.

In a further exemplary solution of the invention the node may classify its adjacent nodes according to signal to noise (S/I) into class 1 "neighbors class 1" and class 2 adjacent nodes "neighbors class 2". If the node has more than two class 1 adjacent nodes it may not forward the probe any further but send it back to the originator assuming it is in a completely disordered setup mesh is the best suitable mode. When it has two class 1 adjacent nodes it may send out probes to both of them to derive their adjacent node situation. After a while, each node may receive back the probes form its east and west neighbors with all the requested data filled in.

The exemplary embodiment of a probe which may have a format comprising of the information fields originator, direction, "I am", egress, "neighbors class 1" and "neighbors class 2". The field originator may contain identifier of the originator node, the field direction may contain the direction in which discovery probe may be sent (east, west), the field "I am" may contain the node identifier which fills in its adjacent node information, the field egress may contain the information whether the concerned node has access to a backbone communication network, the field "neighbors class 1" may contain the identifiers of all adjacent nodes having connection performing at least a certain quality criteria and the field "neighbors class 2" may contain the identifiers of all adjacent nodes having connectivity not fulfilling a certain quality criteria.

Table 901 of FIG. 9 shows that a node a may be the originator and need not send a discovery probe since there may four adjacent nodes, node b, node c, node d and node e.

Table 902 and 903 of FIG. 9 shows that a node b may be the originator and may send a discovery probe since there may two adjacent nodes, the node a and node c.

The originator, node b may add its adjacent node information 9000 to discovery probe. The adjacent node information 9000 may comprise setting up the field "I am" to b, the field egress to no, the field "neighbors class 1" to a, and c, and the field "neighbors class 2" to d. Thus, node b may have node a, and node c as class 1 neighbor, may have no egress to backbone communication network, and may have node d as "neighbors class 2" adjacent. Thereafter, node b may broadcast the discovery probes to its adjacent nodes, westbound to node a, and eastbound to node c.

Eastbound, node c may add its adjacent node information 9020 to discovery probe 902. The adjacent node information 9020 may comprise setting up the field "I am" to c, the field egress to no, the field "neighbors class 1" to b and a, and the field "neighbors class 2" to d and e. Thereafter, node c may send the discovery probes to node a. Node a may set up the field "I am" to a, the field egress to no, the field "neighbors class 1" to b, c, d, e and no entry to the field "neighbors class 2" as node a need not have a "neighbors class 2" adjacent node. Thereafter, node a may send the discovery probes back to the originator node b since node a may have more than two adjacent nodes as class 1 adjacent nodes.

Westbound, node a may add its adjacent node information 9030 to discovery probe 903. The adjacent node information 9030 may comprise setting up the field "I am" to a, the field egress to no, the field "neighbors class 1" to b, c, d, e and no entry to the field "neighbors class 2" as node a need not have a "neighbors class 2" adjacent node. Thereafter, node a may send the discovery probes back to the originator node b since node c may have more than two class 1 adjacent nodes.

FIG. 10 shows another exemplary embodiment of a network topology mode proposal which may be setup for a mesh configuration as shown in the present invention at the end of network topology detection procedure.

The setup table may have a format comprising of the information fields, originator, responding nodes, egress, suggested mode and reason. The field originator may contain the identifier of the originator node, the field responding nodes may contain the node identifiers of all nodes responding with network topology discovery information, the field egress may contain the information whether the concerned node may have access to a backbone communication network, the field suggested mode may contain the proposed mode based on the network topology detection information and the field reason may contain the reason for the decision of the suggested mode.

Table 1001 of FIG. 10 shows the setup for node a, comprising of the responding nodes a, and the egress set to no. Node a setup the proposed suggested mode (10100) to mesh because of the reason, node a has too many class 1 neighbors.

Table 1002 of FIG. 10 shows the setup for node b, comprising of the responding nodes b, c, and a, the egress set to no for the nodes b, c, and a. Node a setup the proposed suggested mode (10200) to mesh because of the reason, node a has too many class 1 neighbors.

FIG. 11 shows another exemplary embodiment of a decision matrix which may be used for the resulting topology decision of as shown in the present invention. This phase may happen after all or at least parts of the nodes may have sent their proposal to further nodes that filled out their discovery probe. Thus, all nodes or parts of them may have network topology proposals of parts of the nodes or all the nodes involved.

Before an autonomous switch to appropriate network topology mode may happen, the resulting network topology decision which is the final one, may be performed.

In this exemplary embodiment, there are three possible network topology modes to switch to, mesh mode, daisy chain mode or ring mode. These modes may be ranked in the following way, high for ring mode, middle for daisy chain mode, and low for mesh mode.

Since each node may have the network topology proposals of partial or all other involved nodes available, each node can make a ranking on its own without further communicating to others applying the ranking rule.

In table 1101 of FIG. 11 all nodes, node a, b, c, d, and e propose network topology mode daisy chain, so the resulting mode (11100) is network topology daisy chain and every node may switch to this resulting network topology mode.

In table 1102 of FIG. 11 the nodes, node b, c, d, and e propose network topology mode daisy chain (11202), but node a proposes network topology mode mesh (11201), so the resulting mode (11200) is network topology mode mesh since mesh has a lower rank and every concerned node may switch to this network topology mode.

In table 1103 of FIG. 11 the nodes, node b, c, and d, propose network topology mode ring, but node a and e propose network topology mode daisy chain, so the resulting mode (11300) may be calculated as network topology mode daisy chain since daisy chain may have a lower rank and every concerned node may switch to this network topology mode.

Figure 12:
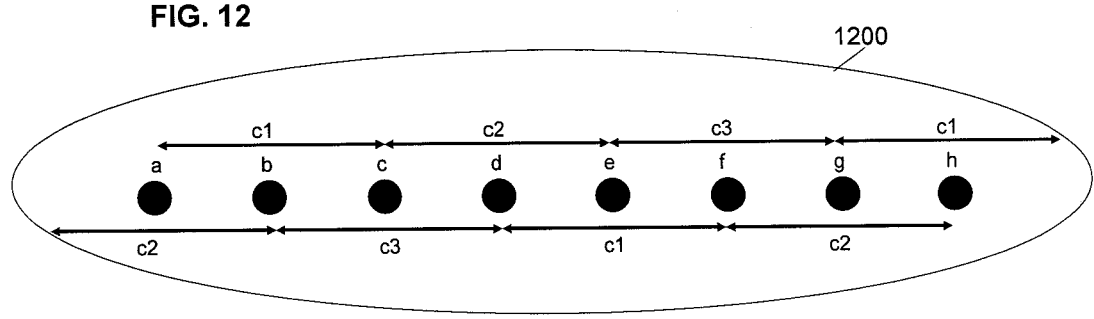
FIG. 12 shows an exemplary embodiment of the present invention comprising of a specific operation of a daisy chain configuration wherein direct neighbor nodes are skipped when data are forwarded.

FIG. 12 shows an exemplary embodiment of the present invention comprising of a specific operation of a daisy chain configuration wherein direct neighbor nodes may be skipped when data are forwarded. The nodes a till h may be ordered in daisy chain manner and the traffic may only be forwarded along the chain.

Pulled lines connect over-next adjacent nodes of the chain, skipping those nodes, which may adjacent directly with each other. As an example the node a skips node b when forwarding data to node c although node b is a direct neighbored to node a. As adjacent nodes may be classified in terms of quality, in the example of FIG. 12 node a may be connected to nodes c with poorer signal to noise ratio (S/I) than to node b which is the direct neighbor. In normal operation mode, a frequency reuse of three is employed to avoid interference. Thus, in sequence 1200 of FIG. 12, node a uses radio bearer c1 for-warding data to node c, node c may use radio bearer c2 to node e and node e may use radio bearer c3 to node g before the radio bearer are reused in this chain. The skipped nodes may use the radio bearer cross to the radio bearer sequence to avoid interference. Thus, node b may use radio bearer c3 to node d, node d may use radio bearer c1 to node f and node f may use radio bearer c2 to node h.

Figure 13:
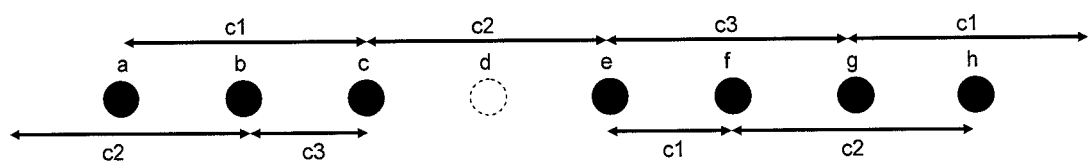
FIG. 13 shows an exemplary embodiment of the present invention wherein nodes discover the break of a direct neighbor node.

FIG. 13 shows an exemplary embodiment of the present invention wherein nodes discover the break of a direct neighbor node. In this scenario node d may fail to operate. The direct neighboring nodes c and e may discover the break and help out for data forwarding of the affected nodes b and f.

Figure 14:
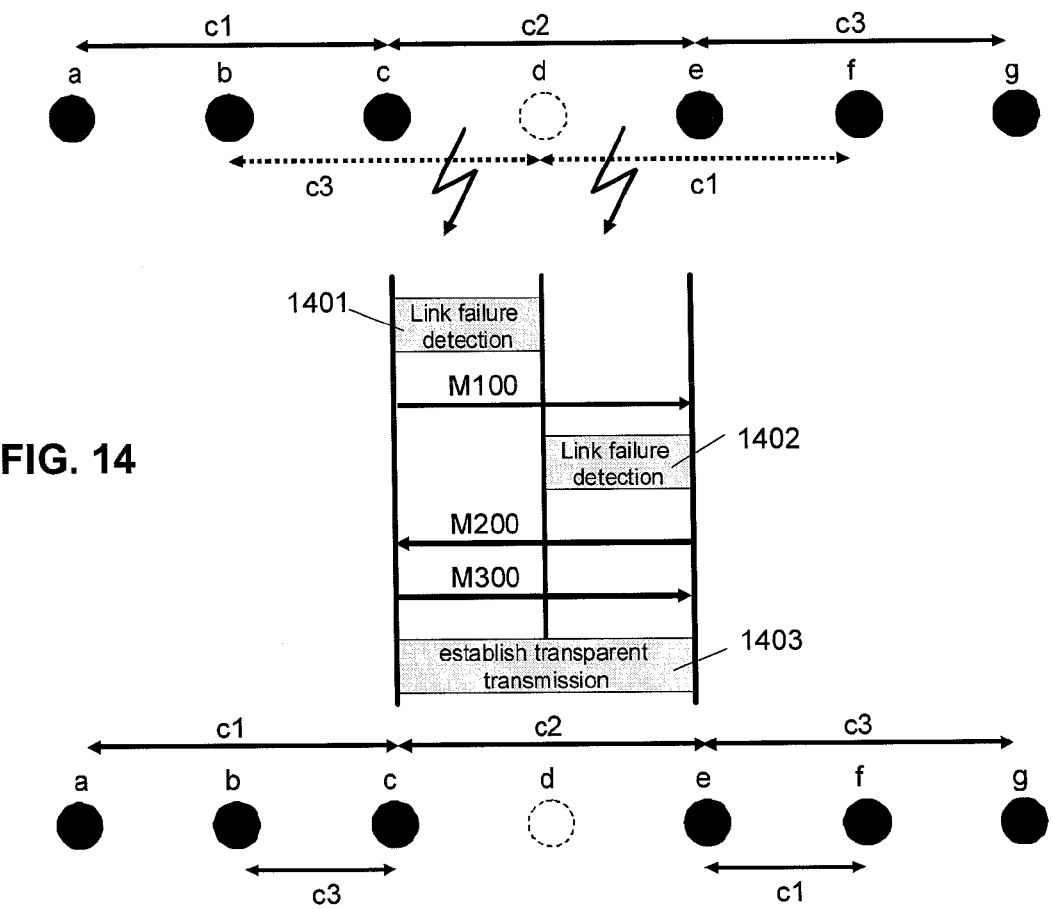
FIG. 14 shows an exemplary embodiment of the present invention comprising of a transparent resilience mode and the corresponding handling of a failover.

FIG. 14 shows an exemplary embodiment of the present invention comprising of transparent resilience mode and the corresponding handling of a failover. When node d fails, one of the nodes, c or e may detect the broken link, exemplary by not receiving signals from d any longer. In the FIG. 14 node c detects the link failing 1401 of node d. It reports to node e his suspect by sending the message M100 comprising of the information node d failed and an indication about its capability handling transparent and non-transparent resilience modes. Exemplary, the node c may have up to three radio heads handling up to three carriers in parallel. Upon receipt of this command message, node e may search for node d, may detect the link failure detection 1402 of node d and may acknowledge its unavailability by sending the message M200 comprising of the information of the link failing of node d, and the suggestion using resilience mode transparent. Node c may confirm the suggested mode by sending the message M300 comprising of the confirmation of using resilience mode transparent. Thereafter, node c as well as node e may switch to a transparent resilience mode and may establish transparent transmission 1403. The behavior of the affected adjacent nodes b and f may be transparent to node d as before as node c and e has taken over the role of d.

Figure 15:
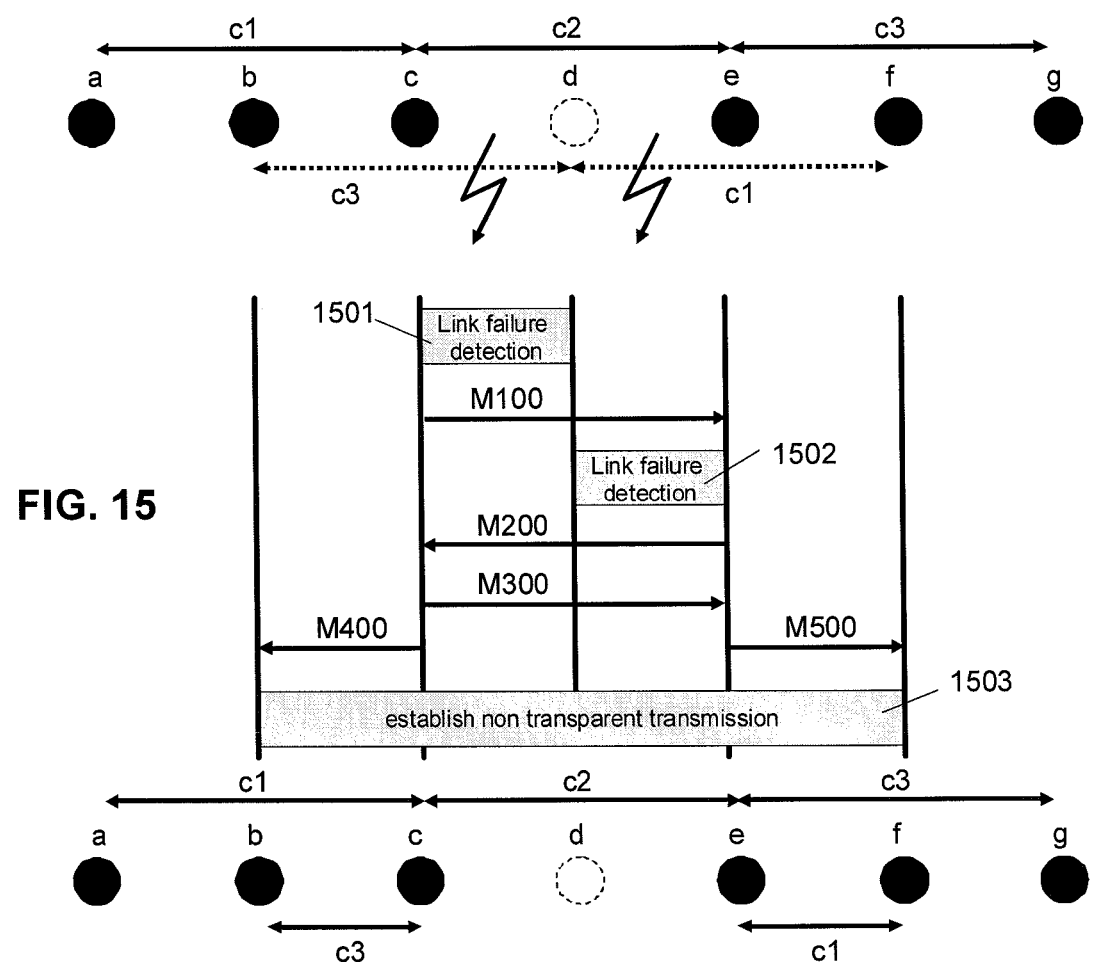
FIG. 15 shows an exemplary embodiment of the present invention comprising of non transparent resilience mode and the corresponding handling of a failover.

FIG. 15 shows an exemplary embodiment of the present invention comprising of non transparent resilience mode and the corresponding handling of a failover. When node d fails, one of the nodes, c or e may detect the broken link, exemplary by not receiving signals from d any longer. In the FIG. 15 node c detects the failing 1501 of node d. It reports to node e his suspect by sending the message M100 comprising of the information node d failed and an indication about its capability handling transparent and non-transparent resilience modes. Exemplary, the node c may have up to three radio heads handling up to three carriers in parallel. Upon receipt of this command message node e may search for node d, may detect the link failure 1502 of node d and may acknowledge its unavailability by sending the message M200 comprising of the information of link failure towards node d, and the suggestion using resilience mode transparent. Node c may confirm the suggested mode by sending the message M300 comprising of the confirmation of using resilience mode non-transparent. Thereafter, node c may send a message M400 as well as node e may send a message M500 indicating that a non-transparent transmission may be established to their adjacent nodes, node b respectively node f. Node b and node f may switch to a non-transparent resilience mode and may establish non-transparent transmission 1503.

Using these resiliency methods the system may operate in a beneficial way, maximum throughput along the daisy chain because the advantage of point-to-point may be used at dedicated carriers, guaranteed resilience even if nodes differ in terms of radio resource capabilities and the telecommunication network may operate with single carrier as well as multi-carrier nodes.

This solution may be tailored in a beneficial way for existing WiFi solutions as standard access points may run up to 3 carriers, the identity handling (SSID) may in place, one access point may be replaced by another one taking over the role of another one without any additional control message flow, very cost efficient especially when operating in an unlicensed band, and no synchronization needed (CSMA/CA). The invented method may be applied to any existing air interface, licensed and unlicensed.

The invention claimed is:

1. A method comprising:
   detecting network topologies at least by:
      sending, from an initiating node to at least one further node in a telecommunications network comprising a plurality of nodes comprising at least one adjacent node that is adjacent to the initiating node and at least one further node distinct from the at least one adjacent node, a first information message comprising a proposed network topology,
      receiving, at the initiating node from the at least one further node, a second information message comprising a further proposed network topology, wherein each proposed network topology of a plurality of possible network topologies describes an arrangement of nodes and allowed communication connections between the nodes in the arrangement, and wherein different network topologies have different arrangement of nodes and corresponding allowed communication connections, and
   employing a network topology at least by
      switching, by the initiating node, to a resulting network topology based at least in part on the proposed network topology and the further proposed network topology, and
      communicating by the initiating node based on the resulting network topology, wherein the communicating comprises communicating with only certain one or more of the plurality of nodes and corresponding allowed communication connections based on the resulting network topology.

2. A method according to claim 1, wherein network topologies are ranked and the resulting network topology is a least ranked network topology if the further proposed network topology differs from the proposed network topology.

3. A method according to claim 1, wherein the resulting network topology is a daisy chain type of topology and communicating by the initiating node based on the resulting network topology comprises communicating with only certain single one of the plurality of nodes and corresponding allowed communication connections based on the daisy chain type of technology.

4. A method according to claim 3 wherein:
   the resulting network topology comprises:
      the initiating node, a first adjacent node, a second adjacent node, a first further node, and a second further node, each node having the capability of using at least two different radio bearers,
      the initiating node being adjacent to the first adjacent node and to the second adjacent node,
      the first further node being adjacent to the second adjacent node and the second further node,
   communicating with only certain one or more of the plurality of nodes and corresponding allowed communication connections further comprises the following:
      the second adjacent node configured to forward data directly to the first adjacent node using a first radio bearer,
      the second further node configured to forward data directly to the second adjacent node using a second radio bearer and
      the initiating node configured to forward data directly to the first further node using a third radio bearer.

5. A method according to claim 4 wherein the method further comprises:
   negotiating which of the radio bearers is used for forwarding the data between the first adjacent node and the second adjacent node,
   negotiating which of the radio bearers is used for forwarding the data between the second adjacent node and the second further node, and
   negotiating which of the radio bearers is used for forwarding the data between the initiating node and the first further node.

6. A method according to claim 4, wherein the method further comprises:
   detecting, at the second adjacent node, a link failure of a link between the second adjacent node and the first further node,
   sending a link failure detection message from the second adjacent node to the second further node,
   receiving, at the second adjacent node, an acknowledge message acknowledging the link failure detection message, and
   establishing a transparent transmission from the second adjacent node to the second further node,
   wherein the second adjacent node switches into transparent transmission mode, and wherein the switching takes place by receiving traffic from the initiating node on the third radio bearer and forwarding traffic from the initiating node to the second further node.

7. A method according to claim 4 wherein the method further comprises:
   detecting, at the second adjacent node, a link failure of a link between the second adjacent node and the first further node,
   sending a link failure detection from the second adjacent node to the second further node,
   receiving, at the second adjacent node from the second further node, an acknowledge message acknowledging the link failure detection message, and
   establishing a non transparent transmission mode,
   wherein the second adjacent node switches into non transparent transmission mode by sending a message to the initiating node.

8. A method according to claim 1, wherein the method further comprises:
   broadcasting, from the initiating node, a discovery message to at least one adjacent node in the plurality of nodes,
   receiving, at the initiating node from the at least one further node, results from a discovery message response,
   analyzing, by the initiating node, the results from the discovery message response, and
   determining, by the initiating node, the proposed network topology.

9. The method of claim 8, wherein each node in the plurality of nodes has a capability of using at least two different radio bearers.

10. A method according to claim 1, wherein the method further comprises:
    receiving, at a first further node, a discovery message from the at least one adjacent node,
    analyzing, by the first further node, a quality of a connection from the first further node to the at least one adjacent node, and
    based at least in part on result of the analysis, broadcasting, from the first further node, a discovering message to at least one node which is adjacent to the first further node or sending, from the first further node, the discovery message response to the initiating node.

11. A method according to claim 1, further comprising broadcasting, from the initiating node, a discovery message to at least one adjacent node in the plurality of nodes, receiving, at the initiating node from the at least one further node, results from a discovery message response, and wherein the discovery message response from a first further node comprises information about connectivity between the first further node and at least one node which is adjacent to the first further node.

12. A method according to claim 1, further comprising broadcasting, from the initiating node, a discovery message to at least one adjacent node in the plurality of nodes, receiving, at the initiating node from the at least one further node, results from a discovery message response, and where a first further node has exactly one adjacent node, and the method further comprises:
sending, from the first further node, the discovery message response to the initiating node.

13. An apparatus comprising at least one processor and at least one memory including computer program code, the at least one memory and the computer program code being configured, with the at least one processor, to cause the apparatus to perform at least the following:
detecting network topologies at least by:
sending, from an initiating node to at least one further node in a telecommunications network comprising a plurality of nodes comprising at least one adjacent node that is adjacent to the initiating node and at least one further node distinct from the at least one adjacent node, a first information message comprising a proposed network topology,
receiving, at the initiating node from the at least one further node, a second information message comprising a further proposed network topology type of operation from the further node, wherein each proposed network topology of a plurality of possible network topologies describes an arrangement of nodes and allowed communication connections between the nodes in the arrangement, and wherein different network topologies have different arrangement of nodes and corresponding allowed communication connections, and
employing a network topology at least by:
switching, by the initiating node, to resulting network topology based at least in part on the proposed network topology and the further proposed network topology, and
communicating by the initiating node based on the resulting network topology, wherein the communicating comprises communicating with only certain one or more of the luralit of nodes and corresponding allowed communication connections based on the resulting network topology.

14. An apparatus according claim 13 wherein the apparatus is a network apparatus in a telecommunication network.

15. An apparatus according to claim 13 wherein the apparatus is a node.

16. An apparatus according to claim 13, wherein network topologies are ranked and the resulting network topology is a least ranked network topology if the further proposed network topology differs from the proposed network topology.

17. An apparatus according to claim 13, wherein the resulting network topology is a daisy chain type of topology and communicating by the initiating node based on the resulting network topology comprises communicating with only certain single one of the plurality of nodes and corresponding allowed communication connections based on the daisy chain type of technology.

18. An apparatus according to claim 13, wherein the at least one memory and the computer program code are further configured, with the at least one processor, to cause the apparatus to perform at least the following:
broadcasting, from the initiating node, a discovery message to at least one adjacent node in the plurality of nodes,
receiving, at the initiating node from the at least one further node, results from a discovery message response,
analyzing, by the initiating node, the results from the discovery message response, and
determining, by the initiating node, the proposed network topology.

19. An apparatus according to claim 13, wherein the at least one memory and the computer program code are further configured, with the at least one processor, to cause the apparatus to perform at least the following: broadcasting, from the initiating node, a discovery message to at least one adjacent node in the plurality of nodes, receiving, at the initiating node from the at least one further node, results from a discovery message response, and wherein the discovery message response from a first further node comprises information about connectivity between the first further node and at least one node which is adjacent to the first further node.

20. A computer program product comprising a non-transitory computer-readable medium bearing computer program code embodied therein for use with a computer, the computer program code comprising instructions that, when executed by an apparatus, cause the apparatus to perform:
detecting network topologies at least by:
sending, from an initiating node to at least one further node in a telecommunications network comprising a plurality of nodes comprising at least one adjacent node that is adjacent to the initiating node and at least one further node distinct from the at least one adjacent node, a first information message comprising a proposed network topology,
receiving, at the initiating node from the at least one further node, a second information message comprising a further proposed network topology, wherein each proposed network topology of a plurality of possible network topologies describes an arrangement of nodes and allowed communication connections between the nodes in the arrangement, and wherein different network topologies have different arrangement of nodes and corresponding allowed communication connections, and
employing a network topology at least by:
switching, by the initiating node, to a resulting network topology based at least in part on the proposed network topology and the further proposed network topology, and
communicating by the initiating node based on the resulting network topology, wherein the communicating comprises communicating with only certain one or more of the plurality of nodes and corresponding allowed communication connections based on the resulting network topology.

\* \* \* \* \*

UNITED STATES PATENT AND TRADEMARK OFFICE
CERTIFICATE OF CORRECTION

| | | |
|---|---|---|
| PATENT NO. | : 8,976,704 B2 | Page 1 of 1 |
| APPLICATION NO. | : 12/702394 | |
| DATED | : March 10, 2015 | |
| INVENTOR(S) | : Morper | |

It is certified that error appears in the above-identified patent and that said Letters Patent is hereby corrected as shown below:

In the Claims

Claim 13, col. 23, line 51 "luralit" should be deleted and --plurality-- should be inserted.

Signed and Sealed this
Nineteenth Day of May, 2015

Michelle K. Lee
*Director of the United States Patent and Trademark Office*